（12）United States Patent
Dong et al.

(10) Patent No.: US 12,170,156 B2
(45) Date of Patent: Dec. 17, 2024

(54) POWER EQUIPMENT AND ASSOCIATED MANUFACTURING METHOD

(71) Applicant: Hitachi Energy Ltd, Zürich (CH)

(72) Inventors: XiaoBing Dong, Beijing (CN); Lars Magnusson, Ludvika (SE); Xuan Dong, Shaanxi (CN)

(73) Assignee: Hitachi Energy Ltd, Zürich (CH)

( * ) Notice: Subject to any disclaimer, the term of this patent is extended or adjusted under 35 U.S.C. 154(b) by 225 days.

(21) Appl. No.: 17/800,661

(22) PCT Filed: Feb. 24, 2020

(86) PCT No.: PCT/CN2020/076386
§ 371 (c)(1),
(2) Date: Aug. 18, 2022

(87) PCT Pub. No.: WO2021/168604
PCT Pub. Date: Sep. 2, 2021

(65) Prior Publication Data
US 2023/0352216 A1 Nov. 2, 2023

(51) Int. Cl.
H01B 17/34 (2006.01)
H01B 3/20 (2006.01)
(Continued)

(52) U.S. Cl.
CPC ............... *H01B 17/34* (2013.01); *H01B 3/20* (2013.01); *H01F 27/321* (2013.01); *H01G 2/10* (2013.01)

(58) Field of Classification Search
None
See application file for complete search history.

(56) References Cited

U.S. PATENT DOCUMENTS 1,562,428 A * 11/1925 Bingay .................. H01F 27/14
174/12 R
1,770,130 A * 7/1930 Dunmire ................ H01B 17/32
174/30
(Continued)

FOREIGN PATENT DOCUMENTS

CN 1396459 A * 2/2003 ............. H01F 27/02
CN 103109428 A 5/2013
(Continued)

OTHER PUBLICATIONS

International Search Report and Written Opinion of the International Searching Authority, PCT/CN2020/076386, mailed Dec. 1, 2020, 9 pages.
(Continued)

Primary Examiner — Krystal Robinson
(74) Attorney, Agent, or Firm — Sage Patent Group

(57) ABSTRACT

Embodiments of the present disclosure relate to a power equipment and method for providing the same. Embodiments of the present disclosure relate to a power equipment. The power equipment includes a high voltage part, a low voltage part, and an insulation oil adapted to impregnate the high voltage part and insulate the high voltage part from the low voltage part. The insulation oil is partially filled with polymer particles with a lower thermal expansion coefficient than the insulation oil. According to embodiments of the present disclosure, the degree of expansion of the insulation medium can be reduced in a cost-effective way.

15 Claims, 4 Drawing Sheets

(51) Int. Cl.
*H01F 27/32* (2006.01)
*H01G 2/10* (2006.01)

(56) References Cited

U.S. PATENT DOCUMENTS

| | | | | | |
|---|---|---|---|---|---|
| 2,274,954 | A | * | 3/1942 | Dykstra | H01B 17/40 |
| | | | | | 174/176 |
| 3,331,023 | A | * | 7/1967 | Adkins | G01R 15/14 |
| | | | | | 310/15 |
| 3,397,310 | A | * | 8/1968 | Anderson | G04F 5/14 |
| | | | | | 250/288 |
| 3,532,800 | A | * | 10/1970 | Buehler | H01B 3/485 |
| | | | | | 162/146 |
| 3,562,457 | A | * | 2/1971 | Peek | H01H 33/666 |
| | | | | | 336/174 |
| 3,617,606 | A | * | 11/1971 | Dutton | H01B 17/28 |
| | | | | | 174/31 R |
| 4,330,439 | A | * | 5/1982 | Nishimatsu | H01B 3/22 |
| | | | | | 338/80 |
| 4,609,775 | A | * | 9/1986 | Moran | H01B 17/34 |
| | | | | | 174/31 R |
| 4,700,123 | A | * | 10/1987 | Beling | G01R 15/142 |
| | | | | | 323/215 |
| 4,894,609 | A | * | 1/1990 | Fujiki | G01R 15/242 |
| | | | | | 324/96 |
| 5,012,182 | A | * | 4/1991 | Fujiki | G01R 15/242 |
| | | | | | 324/96 |
| 6,316,542 | B1 | * | 11/2001 | Berger | H01B 3/30 |
| | | | | | 524/789 |
| 2010/0255288 | A1 | | 10/2010 | Golner et al. | |
| 2016/0148744 | A1 | * | 5/2016 | Sjöberg | H01B 27/14 |
| | | | | | 336/58 |

FOREIGN PATENT DOCUMENTS

| | | |
|---|---|---|
| CN | 104046409 A | 9/2014 |
| CN | 104046437 A | 9/2014 |
| CN | 104327910 A | 2/2015 |
| CN | 204289015 U | 4/2015 |
| CN | 105296108 A | 2/2016 |
| CN | 105632659 A | 6/2016 |
| EP | 2533251 A1 | 12/2015 |
| EP | 3023997 A1 | 5/2016 |
| JP | S5214998 U | 2/1977 |
| JP | 2006150277 A * | 6/2006 |
| JP | 2007227784 A | 9/2007 |

OTHER PUBLICATIONS

Extended European Search Report, European Patent Application No. 20921654.8, mailed Oct. 16, 2023, 7 pages.

* cited by examiner

POWER EQUIPMENT AND ASSOCIATED MANUFACTURING METHOD

CROSS REFERENCE TO RELATED APPLICATIONS

This application is a 35 U.S.C. § 371 national stage application of PCT International Application No. PCT/CN2020/076386 filed on Feb. 24, 2020, the disclosure and content of which is incorporated by reference herein in its entirety.

FIELD

Example embodiments of the present disclosure generally relate to improvement of insulation medium, and more particularly, to a power equipment and a method of providing the power equipment.

BACKGROUND

Liquid insulation medium like transformer oil or synthetic oil has been widely used in a high voltage power equipment to insulate a high voltage part from a low voltage part. In such an application, the liquid insulation oil may provide enhanced dielectric strength for the power equipment. Besides, the liquid insulation medium, or referred as insulation oil, can also be used as a thermal exchange medium when natural or forced cooling system is applied, for example the high voltage power transformer. In such an application, the expansion of the liquid insulation medium under temperature rise is a challenge for insulation system.

Several methods have been proposed to cope with the expansion of the insulation oil. For example, a bellow may be used to avoid any damage of the insulation structure due to the thermal expansion. However, the bellow would increase the overall cost of the power equipment. It is further proposed to use certain liquid insulation medium with lower thermal expansion coefficient. Moreover, for the selection of the liquid insulation medium, it is hard to replace the present liquid insulation medium which has been proved with reliable performance for years because it is always costly and hard to balance other technical requirements. How to insulate the high voltage part from the low voltage part in a cost-effective way without affecting the insulation performance of the oil becomes a challenge for the designers.

Therefore, there is still a need for a simpler and cheaper design to mitigate the expansion of the insulation oil.

SUMMARY

Example embodiments of the present disclosure propose a solution for mitigating the expansion and improving the dielectric performance in a convenient and cheap way.

In a first aspect, embodiments of the present disclosure relate to a power equipment. The power equipment comprises a high voltage part: a low voltage part; and an insulation oil adapted to impregnate the high voltage part and insulate the high voltage part from the low voltage part: wherein the insulation oil is partially filled with polymer particles with a lower thermal expansion coefficient than the insulation oil.

According to embodiments of the present disclosure, the degree of expansion of the insulation medium can be reduced in a cost-effective way.

In some embodiments, the polymer particles are made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combination thereof.

In some embodiments, the polymer particles have greater or equal breakdown strength than the insulation oil.

In some embodiments, the power equipment is a high voltage instrument transformer provided with a tubular insulator coupled to the low voltage part of the high voltage instrument transformer, and a gap between the high voltage part and the tubular insulator is filled with the insulation oil, and the high voltage part is fully impregnated with insulation oil.

In some embodiments, the power equipment is a power capacitor provided within the low voltage part, and the low voltage part is a cuboid enclosure of the power capacitor; and a gap between the high voltage part and the low voltage part is filled with the insulation oil, and the high voltage part is fully impregnated with insulation oil.

In some embodiments, the insulation oil is selected from a group comprising Faradol 670, Faradol 600, Faradol 810, PXE and/or combination thereof.

In some embodiments, the power equipment is a power transformer provided within the low voltage part, and the low voltage part is a cuboid housing of the power transformer, the power transformer comprising: a yoke provided within the cuboid housing; and an iron disk provided within the yoke: wherein the high voltage part is provided around the iron disk, and the insulation oil is provided between the cuboid container and the yoke, between the yoke and the iron disk, and between the iron disk and the high voltage part.

In some embodiments, the insulation oil comprises hydrotreated light naphthenic.

In some embodiments, the low voltage part is grounded.

In a second aspect, embodiments of the present disclosure relate to a method of providing a power equipment. The method comprises: providing a high voltage part: providing a low voltage part: providing insulation oil adapted to impregnate the high voltage part and insulate the high voltage part from the low voltage part; and partially filling the insulation oil with polymer particles with a lower thermal expansion coefficient than the insulation oil.

In some embodiments, the polymer particles are made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combinations thereof.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
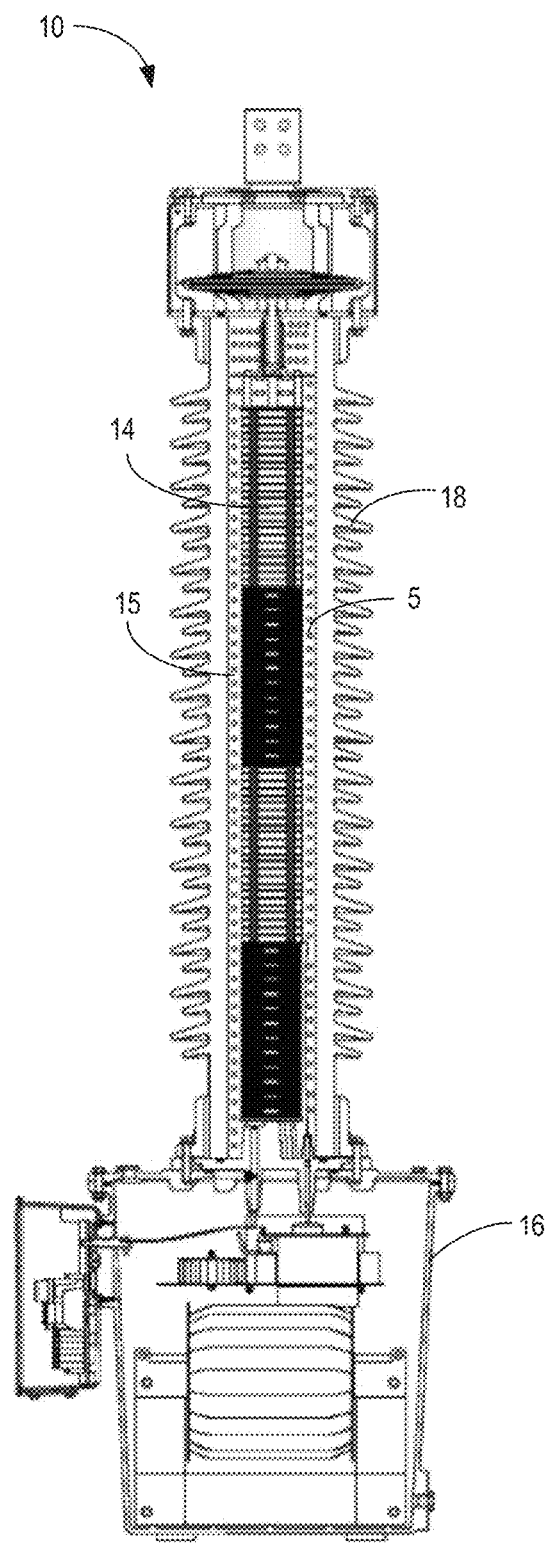
FIG. 1 illustrates a schematic view of a power equipment in accordance with a first exemplary embodiment of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

First Example Implementation

FIG. 1 shows a first example implementation of the power equipment. As shown, the power equipment is a high voltage instrument transformer 10 in this implementation.

The high voltage instrument transformer 10 comprises a high voltage part 14 and a low voltage part 16. Insulation oil is contained in the high voltage instrument transformer 10, which is adapted to insulate the high voltage part 14 from the low voltage part 16. As illustrated in FIG. 1, the insulation oil is partially filled with polymer particles 5 and impregnates the high voltage part 14. The polymer particles 5 have a lower thermal expansion coefficient than the insulation oil.

By incorporating the polymer particles 5 into the high voltage instrument transformer 10, a portion of the insulation oil would be occupied by the polymer particles 5 and thus the proportion of the insulation oil in the mixture can be reduced. According to embodiments of the present disclosure, the usage of the insulation oil can be significantly diminished to save the cost.

Moreover, as the thermal expansion coefficient of the polymer particles 5 is lower than that of the insulation oil, the expansion of the mixture would be less, which reduces the failure risk of the expansion components.

In some embodiments, the polymer particles 5 in the high voltage instrument transformer 10 may be made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combinations thereof. In this way, the polymer particles 5 are commercially available and may be obtained at a generally low cost. Therefore, the total cost of the particle-insulation oil mixture can be kept low.

It is to be understood that the material listed herein is only by way of example, and the specific materials are not limited to embodiments of the present disclosure, as long as they are compatible with the insulation oil.

In some embodiments, the insulation oil in the high voltage instrument transformer 10 may be a transformer oil containing hydro treated light naphthenic. The thermal expansion coefficient of 650-800×10$^{-6}$/K.

It is to be understood that the materials and values list above are only illustrative, rather than restrictive. The specific form the insulation oil is not limited herein.

Table 1 shows the values of the thermal expansion coefficient of some example materials of the polymer particles 5.

TABLE 1

| Material | Thermal expansion coefficient (×10$^{-6}$/K) | Permittivity (50 Hz) |
| --- | --- | --- |
| Polyethylene (PE) | 59-110 (HDPE) 100-220 (LDPE) | 2.3 |
| Polypropylene (PP) | 81-100 | 2.3 |
| Polystyrene (PS) | 50-83 | 2.45-3.10 |
| Polyethylene Terephthalate (PET) | 65 | 2.9-3.2 |
| Polyamide (PA) | 79-87 | 3.6-4.0 |
| Nylon 66 | 90-100 | 3.8-4.0 |
| Polycarbonate (PC) | 50-70 | 2.8-3.1 |
| Acrylonitrile Butadiene Styrene (ABS) | 60-130 | 2.5-2.7 |
| Polyoxymethylene/Polyformaldehyde (POM) | 40-100 | 3.7-3.8 |

As can be seen from Table 1, the thermal expansion coefficient of the polymer particles 5 is lower than the transformer oil.

In some embodiments, the transformer oil may have a permittivity of 2.2-2.4 at 50 Hz. It is to be understood that the values list above are only illustrative, rather than restrictive. In some embodiments, the permittivity of the transformer oil may be of other values, which depends on the actual needs of the users.

Table 1 also shows the permittivity of some exemplary materials of the polymer particles 5. As the permittivity of the polymer particle 5 is substantially the same level as the transformer oil, the breakdown field strength of the mixture would not be affected. In some embodiments, the permittivity of the polymer particle is even less than the insulation oil, the breakdown strength of the mixture would be increased.

In this way, by incorporating the polymer particles into the insulation oil, the dielectric loss of the power equipment would be rather low under certain frequency spectrum, for example 20 Hz to 1 MHz. Moreover, such a mixture of the polymer particle 5 and the insulation oil has no much impact on electrical stress control in the high voltage instrument transformer 10. It is to be understood that the values list above are only illustrative, rather than restrictive.

In some embodiments, the polymer particles 5 may have greater or equal breakdown strength than the insulation oil. Therefore, the polymer particles 5 can withstand the voltage together with the insulation oil. In this way, the mixture of the polymer particles 5 and the insulation oil can withstand a higher voltage without many changes to the existing structure of the high voltage instrument transformer 10.

In some embodiments, as illustrated in FIG. 1, a gap 15 is formed between the high voltage part 14 and the tubular insulator 18 and the gap 15 is filled with the insulation oil. In some embodiments, the high voltage part 14 is fully impregnated with insulation oil.

In some embodiments, the low voltage part 16 may be grounded. Therefore, the security of the high voltage instrument transformer 10 can be ensured.

As the polymer particles 5 have much lower impurities, the cleanness can be guaranteed by mass industry production, which also helps to further reduce the price.

According to example implementation, the overall insulation performance of the high voltage instrument transformer 10 can be improved. Moreover, since the polymer particles 5 have good material compatibility with the insulation oil, which can keep their original performance by years under normal operation, the structural arrangement of the equipment would not be affected. This may be satisfactory for the users.

Second Example Implementation

Figure 2:
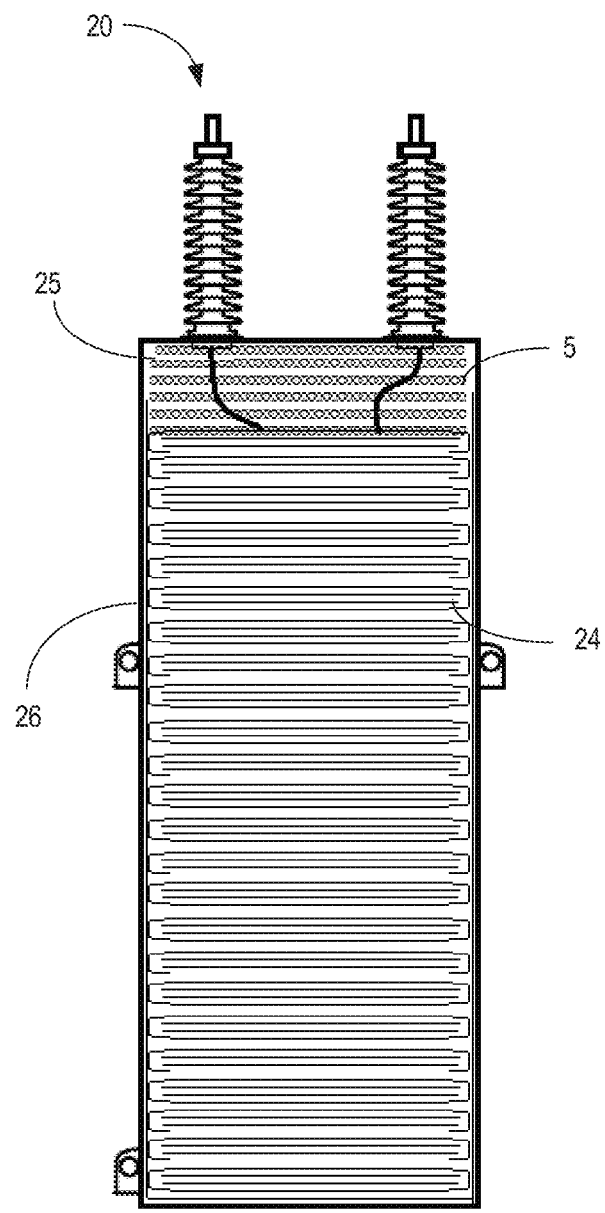
FIG. 2 illustrates a schematic view of a power equipment in accordance with a second exemplary embodiment of the present disclosure.

FIG. 2 shows a second example implementation of the power equipment. As shown, the power equipment is a power capacitor 20 in this implementation.

As illustrated, the power capacitor 20 comprises a high voltage part 24 and a low voltage part 26. The low voltage part 26 is insulated from the high voltage part 24. The lower voltage part 26 is a cuboid enclosure of the power capacitor 20 and the power capacitor 20 is provided within the lower voltage part 26. It is to be understood that the shape of the enclosure of the power capacitor 20 is not limited herein. Other shapes are possible according to the specific operation environment.

As illustrated in FIG. 2, a gap 25 is formed between the high voltage part 24 and the low voltage part 26. The gap 25 is filled with the insulation oil. In some embodiments, the high voltage part 24 is fully impregnated with insulation oil.

In this way, the less volume ratio of insulation oil reduces the expansion volume and further reduces the mechanical stress on container, the risk of mechanical failure of container and leakage of liquid insulation can be reduced accordingly. More "dry" feature also reduces the risks incurred by transportation and/or earthquake vibration.

In some embodiments, the insulation oil in the power capacitor 20 may be selected from a group comprising Faradol 670, Faradol 600, Faradol 810, PXE and/or combination thereof. In some embodiments, the thermal expansion coefficient of the insulation oil in the power capacitor 20 may be 700-780×10$^{-6}$/K. It is to be understood that the values list above are only illustrative, rather than restrictive.

In some embodiments, the polymer particles 5 in the high voltage instrument transformer 10 may be made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combinations thereof.

With reference to Table 1, the thermal expansion coefficient of the polymer particles 5 is lower than the insulation oil. Therefore, the degree of expansion of the insulation medium inside the power capacitor 20 can be decreased.

In some embodiments, the low voltage part 26 may be grounded. Therefore, the security of the high voltage instrument transformer 10 can be ensured.

Compared with the conventional design, the problem caused by thermal expansion of insulation can be avoided in the power capacitor 20 according to embodiments of the present disclosure.

Third Example Implementation

Figure 3:
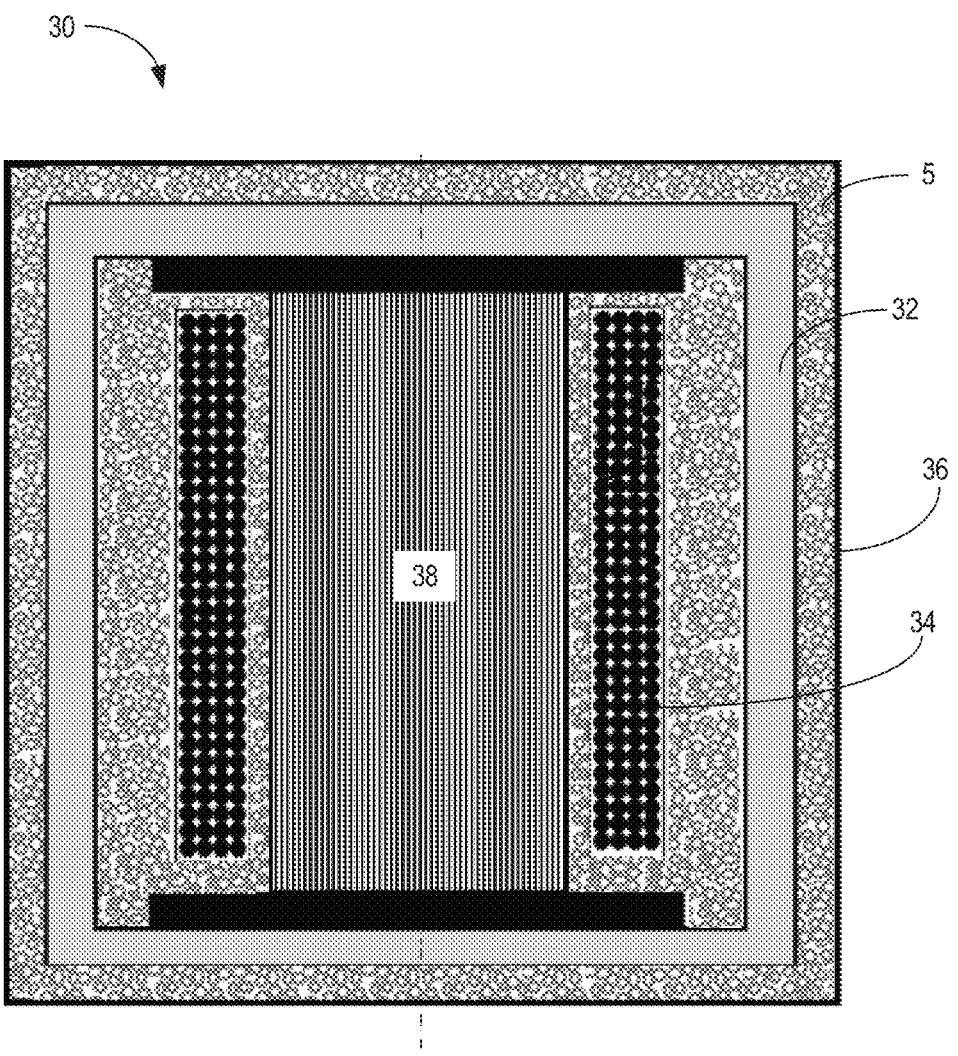
FIG. 3 illustrates a schematic view of a power equipment in accordance with a third exemplary embodiment of the present disclosure.

FIG. 3 shows a third example implementation of the power equipment. As shown, the power equipment is a power transformer 30 in this implementation.

As illustrated in FIG. 3, the power transformer 30 comprises a high voltage part 34 and a low voltage part 36 and the low voltage part is a cuboid housing of the power transformer 30. The power transformer further comprises a yoke 32 and an iron disk 38. The yoke 32 is provided within the cuboid housing and the iron disk is arranged within the yoke 32. It is to be understood that the shape of the housing of the power transformer 30 is not limited herein. Other shapes are possible according to the need of the users.

As illustrated, the high voltage part 34 is provided around the iron disk 38. The insulation oil fills the space between the cuboid container and the yoke 32, between the yoke 32 and the iron disk 38, and between the iron disk 38 and the high voltage part 34.

In some embodiments, the insulation oil in the power transformer 30 may comprise hydro-treated light naphthenic with a thermal expansion coefficient of 650-800×10$^{-6}$/K. It is to be understood that the values list above are only illustrative, rather than restrictive.

In some embodiments, the polymer particles 5 in the high voltage instrument transformer 10 may be made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combinations thereof.

With reference to Table 1, the thermal expansion coefficient of the polymer particles 5 is lower than the insulation oil. Therefore, the degree of expansion of the insulation medium inside power transformer 30 can be decreased.

In some embodiments, the low voltage part 36 may be grounded to ensure the safety of the power transformer 30.

Compared with the conventional design, by simply incorporating the polymer particles 5 into the insulation oil, the insulation performance of the insulation medium inside the power transformer 30 may be guaranteed.

Example Method

Figure 4:
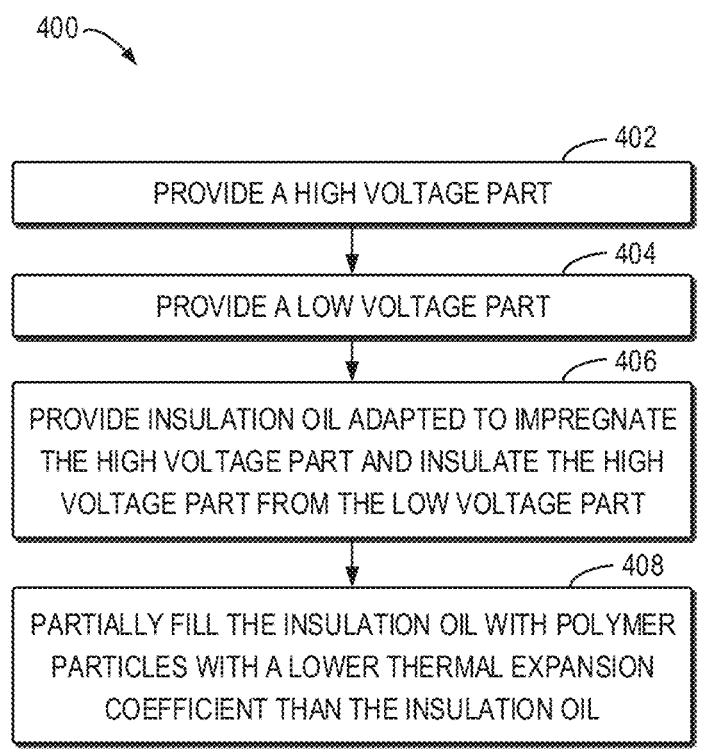
FIG. 4 illustrates a exemplary method of providing a power equipment in accordance with an exemplary embodiment of the present disclosure.

Embodiments of the present disclosure relate to a method of providing a power equipment. FIG. 4 illustrates a method 400 of providing the power equipment in accordance with an exemplary embodiment of the present disclosure.

At block 402, a high voltage part 14, 24, 34 is provided. At block 404, a low voltage part is provided. At block 406, insulation oil adapted to impregnate the high voltage part 14, 24, 34 is provided and the insulation oil is adapted to insulate the high voltage part 14, 24, 34 from the low voltage part. At block 408, the insulation oil is partially filled with polymer particles 5 and the thermal expansion coefficient of the polymer particles 5 is lower than the insulation oil.

In some embodiment, the polymer particles 5 are made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combinations thereof.

It is to be understood that elements and aspects discussed for or in relation with a particular embodiment may be suitably combined with elements and aspects of other embodiments, unless explicitly stated otherwise. It is to be understood that the apparatus and the structure involved in FIG. 4 have been described above with reference to FIGS. 1-3, and the details will not be described hereinafter for the sake of brevity.

Compared with the conventional design, embodiments of the present disclosure propose a simple but effective way to mitigate the expansion for the insulation medium and also improve dielectric performance.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed is:

1. A power equipment comprising:
    a high voltage part;
    a low voltage part; and
    an insulation oil adapted to impregnate the high voltage part and insulate the high voltage part from the low voltage part;
    wherein the insulation oil is partially filled with polymer particles with a lower thermal expansion coefficient than the insulation oil,
    wherein the power equipment is a power capacitor provided within the low voltage part, and the low voltage part is a cuboid enclosure of the power capacitor, and
    a gap between the high voltage part and the low voltage part is filled with the insulation oil, and the high voltage part is fully impregnated with insulation oil, and
    wherein the low voltage part is grounded.

2. The power equipment of claim 1, wherein the polymer particles are made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combination thereof.

3. The power equipment of claim 1, wherein the polymer particles have greater or equal breakdown strength than the insulation oil.

4. The power equipment of claim 1, wherein the power equipment is a high voltage instrument transformer provided with a tubular insulator coupled to the low voltage part of the high voltage instrument transformer, and a gap between the high voltage part and the tubular insulator is filled with the insulation oil, and the high voltage part is fully impregnated with insulation oil.

5. The power equipment of claim 4, wherein the insulation oil is selected from a group comprising Faradol 670, Faradol 600, Faradol 810, PXE and/or combination thereof.

6. The power equipment of claim 1, wherein the insulation oil is selected from a group comprising Faradol 670, Faradol 600, Faradol 810, PXE and/or combination thereof.

7. A power equipment comprising:
    a high voltage part;
    a low voltage part; and
    an insulation oil adapted to impregnate the high voltage part and insulate the high voltage part from the low voltage part;
    wherein the insulation oil is partially filled with polymer particles with a lower thermal expansion coefficient than the insulation oil, wherein the power equipment is a power transformer provided within the low voltage part, and the low voltage part is a cuboid housing of the power transformer, the power transformer comprising:
    a yoke provided within the cuboid housing; and
    an iron disk provided within the yoke;
    wherein the high voltage part is provided around the iron disk, and the insulation oil is provided between the cuboid container and the yoke, between the yoke and the iron disk, and between the iron disk and the high voltage part.

8. The power equipment of claim 7, wherein the insulation oil comprises hydro-treated light naphthenic.

9. The power equipment of claim 7, wherein the low voltage part is grounded.

10. A power equipment comprising:
    a high voltage part;
    a low voltage part; and
    an insulation oil adapted to impregnate the high voltage part and insulate the high voltage part from the low voltage part;
    wherein the insulation oil is partially filled with polymer particles with a lower thermal expansion coefficient than the insulation oil,
    wherein the power equipment is a high voltage instrument transformer provided with a tubular insulator coupled to the low voltage part of the high voltage instrument transformer, and a gap between the high voltage part and the tubular insulator is filled with the insulation oil, and the high voltage part is fully impregnated with insulation oil and wherein the low voltage part is grounded.

11. A method of providing a power equipment, comprising:
    providing a high voltage part;
    providing a low voltage part;
    providing insulation oil adapted to impregnate the high voltage part and insulate the high voltage part from the low voltage part; and
    partially filling the insulation oil with polymer particles with a lower thermal expansion coefficient than the insulation oil,
    wherein the power equipment is a power transformer provided within the low voltage part, and the low voltage part is a cuboid housing of the power transformer, the power transformer comprising:
    a yoke provided within the cuboid housing; and
    an iron disk provided within the yoke;
    wherein the high voltage part is provided around the iron disk, and the insulation oil is provided between the cuboid container and the yoke, between the yoke and the iron disk, and between the iron disk and the high voltage part.

12. The method of claim 11, wherein the polymer particles are made of a material selected from a group consisting of polyethylene, polypropylene (PP), polystyrene (PS), polyethylene terephthalate (PET), polyamide (PA), nylon 66, polycarbonate (PC), Acrylonitrile Butadiene Styrene, polyoxymethylene/polyformaldehyde (POM) and/or combination thereof.

13. The method of claim 11, wherein the power equipment is a high voltage instrument transformer provided with a tubular insulator coupled to the low voltage part of the high voltage instrument transformer, and
   a gap between the high voltage part and the tubular insulator is filled with the insulation oil, and the high voltage part is fully impregnated with insulation oil.

14. The method of claim 11, wherein the power equipment is a power capacitor provided within the low voltage part, and the low voltage part is a cuboid enclosure of the power capacitor, and
   a gap between the high voltage part and the low voltage part is filled with the insulation oil, and the high voltage part is fully impregnated with insulation oil.

15. The method of claim 14, wherein the insulation oil is selected from a group comprising Faradol 670, Faradol 600, Faradol 810, PXE and/or combination thereof.

* * * * *